(12) United States Patent
Witt et al.

(10) Patent No.: US 10,562,621 B2
(45) Date of Patent: Feb. 18, 2020

(54) PARAMOTOR FULLY ARTICULATED/ADJUSTABLE SWING ARM SYSTEM AND HOOP TENSIONER SYSTEM

(71) Applicant: Glidersports, Clinton, MO (US)

(72) Inventors: Shawn R. Witt, Puyallup, WA (US); Garrett Lind Reed, Clinton, MO (US)

(73) Assignee: Glidersports, Clinton, MO (US)

( * ) Notice: Subject to any disclaimer, the term of this patent is extended or adjusted under 35 U.S.C. 154(b) by 321 days.

(21) Appl. No.: 15/619,194

(22) Filed: Jun. 9, 2017

(65) Prior Publication Data

US 2017/0355456 A1 Dec. 14, 2017

Related U.S. Application Data

(60) Provisional application No. 62/347,755, filed on Jun. 9, 2016.

(51) Int. Cl.
*B64C 31/036* (2006.01)
*B64C 1/26* (2006.01)

(52) U.S. Cl.
CPC .............. *B64C 31/036* (2013.01); *B64C 1/26* (2013.01)

(58) Field of Classification Search
CPC .... B64C 31/036; B64C 31/024; B64C 39/026
See application file for complete search history.

(56) References Cited

U.S. PATENT DOCUMENTS

| 10,029,786 B1* | 7/2018 | Adams | ................... B64C 31/024 |
| 2015/0217853 A1* | 8/2015 | Svec | ..................... B64C 31/036 |
| | | | 244/4 A |

OTHER PUBLICATIONS

Adventure Lighten Up X-Race Light article on pp. 115-125 of FREE.AERO, Worldwide Paragliding and Paramotoring Magazine, http://free.aero/en/contentsHTML/Free_aero_Light_E_150/index.html?page=1, 12 page internet printout of pp. 1, 115-125, published Feb. 17, 2016, internet publication.†

Adventure X-Race LT Variable Geometry article on pp. 91-93 of FREE.AERO, Worldwide Paragliding and Paramotoring Magazine, http://en.free.aero/contentsHTML/Harness_free_aero_150dpi_epure/index.html?page=1, 4 page internet printout (pp. 1, 91-93), published Sep. 9, 2015, internet publication.†

\* cited by examiner
† cited by third party

*Primary Examiner* — Philip J Bonzell
*Assistant Examiner* — Tye William Abell
(74) *Attorney, Agent, or Firm* — Hovey Williams LLP (57) ABSTRACT

A fully articulable and adjustable swing arm assembly for a paramotor. The assembly includes a swing arm, a spherical bearing, an arm peg, and a pair of limiting disks. The arm peg extends through a central opening of the spherical bearing, and the pair of limiting disks are located proximate to the spherical bearing. The inner faces of the pair of limiting disks include a taper such that a clearance is formed between each of the opposing faces of the swing arm and a corresponding inner face of one of the limiting disks, permitting the swing arm to move in both a vertical and lateral direction. A lateral position of the swing arm assembly with respect to a frame of the paramotor is adjustable by sliding the arm peg into or out from an arm peg receiving block, which is then secured with a locking pin.

20 Claims, 11 Drawing Sheets

PARAMOTOR FULLY ARTICULATED/ADJUSTABLE SWING ARM SYSTEM AND HOOP TENSIONER SYSTEM

CROSS-REFERENCE TO RELATED APPLICATION

This application claims the benefit of priority of U.S. Provisional Patent Application Ser. No. 62/347,755 entitled "Paramotor Fully Articulated/Adjustable Swing Arm System and Hoop Tensioner System," filed Jun. 9, 2016, the entire disclosure of which is incorporated herein by reference.

BACKGROUND

Paramotors, also known as powered paragliders, combine a traditional paraglider wing or ram-air canopy with a motorized frame. The paraglider wing (more particularly, risers of the paraglider wing), are attached to the frame using one of a variety of suspension systems such as fixed or pivoting underarm bar systems, no bar systems, sliding web underarm bar systems, and fixed, floating, or pivoting J-bar systems. One such suspension system includes a pair of swing arms pivotably coupled to the frame, and the risers of the paraglider wing attach directly to the swing arms via one or more attachment points provided along the pair of swing arms. The frame in turn includes a pilot harness, a motor, a propeller, and a hoop or cage surrounding the propeller. The articulating swing arm attachment system can pivot/articulate in a vertical plane to compensate for the torque placed on the frame by the pilot initiating a turn by either shifting his or her weight or using the turning system built into the canopy/paraglider. Additionally, the attachment system allows the paraglider wing to move independently of the frame and the pilot strapped thereto during flight. This system helps compensate for in-flight turbulence and torque translated to the pilot/frame for the production of thrust from the motor/propeller.

Current swing arms provide limited flexibility, however, because they at most only pivot in one direction (i.e., the vertical plane), and thus do not allow for movement in all axes as the pilot turns the paramotor or as the system reacts to weight shifts of the pilot or torque placed on the system by the motor/propeller. This restricted movement of the swing arms thus limit a pilot's experience and control of the paramotor system and fails to replicate the natural flight of an unpowered paraglider.

Moreover, these swing arms are often mounted at a fixed lateral position with respect to the frame and set at a predetermined width. As a result, current swing arms are unable to accommodate motors of different power ranges or configurations and different-sized pilots, and provide no adjustability to accommodate for a pilot's experience or external flying conditions.

There thus remains a need for a swing arm system that allows the swing arm to rotate and articulate along all axes during flight, and which allows the swing arms to be adjustably mounted in order to accommodate various pilot sizes, engines of different power ranges or configurations, pilot abilities, and external flying conditions.

Furthermore, while current hoop designs are intended to protect a pilot and the paraglider wing from the spinning propeller during use, the hoops are of limited durability and rigidity because they are typically constructed of lightweight material in an effort to reduce overall weight of the paramotor system. These hoops thus do not provide adequate protection to the pilot and paraglider wing, and also may be prone to failure during takeoffs and landings.

There thus remains a need for a hoop or cage that is rigid enough to provide adequate protection for the pilot and paraglider wing from the propeller during flight, power-assisted launches, and hard landings, but which is light enough such that it does not hinder operation of the paramotor.

SUMMARY

Embodiments of the present invention are directed to paramotors, swing arm assemblies, and/or hoop tensioner systems that overcome these and other deficiencies of current paramotor systems.

For example, some embodiments of the invention are directed to a fully articulable swing arm assembly for a paramotor. The swing arm assembly generally includes a swing arm, a spherical bearing, an arm peg, and a pair of limiting disks. The swing arm includes two opposing faces and a bearing hole portion including a through hole extending between the two opposing faces, with the spherical bearing located within the bearing hole portion. The arm peg extends through a central opening of the spherical bearing, and the pair of limiting disks are located proximate to the spherical bearing. The inner faces of the pair of limiting disks include a taper such that a clearance is formed between each of the opposing faces of the swing arm and a corresponding inner face of one of the limiting disks, permitting the swing arm to move in both a vertical and lateral direction during flight. These tapered disks can have different tapers to allow the pilot to tune the system to her desired flying characteristics.

Other embodiments of the invention are directed to an adjustable swing arm assembly for a paramotor. In this embodiment, the arm peg includes a proximate end having a plurality of notches, a shoulder, and a bearing shaft, with the bearing shaft extending from the shoulder and including a threaded distal end. The bearing shaft extends through a central through hole of the inner limiting disk, through the central opening of an inner roller of the spherical bearing, and is threaded into the threaded through hole of the outer limiting disk such that the inner surfaces of the limiting disks contact the inner roller, and such that an outer surface of the inner limiting disk contacts the shoulder. Moreover, the proximate end of the arm peg extends into the socket of the arm peg receiving block and is secured via the locking pin. In this regard, a lateral position of the swing arm assembly with respect to the frame of the paramotor is adjustable by sliding the arm into or out from the arm peg receiving block, and by securing the arm peg in place by sliding the locking pin in one of the plurality of notches.

Still other embodiments of the invention are directed to a paramotor including a frame, a hoop connected to the frame via a plurality of spars, and a pair of the fully articulable and/or adjustable swing arm assemblies discussed above. In some embodiments, the paramotor further includes a hoop tensioner system generally including a tension cable and a threaded tensioner. For embodiments where the hoop includes hollow tubing, at least part of the tension cable is located within the hollow tubing. Moreover, each end of the tension cable includes a ball or terminating attachment system, with a first ball seated in an anchor of the hoop tensioner system, and a second ball received in a handle of the threaded tensioner.

BRIEF DESCRIPTION OF THE SEVERAL VIEWS OF THE DRAWINGS

The present invention is described in detail below with reference to the attached drawing figures, wherein.

DETAILED DESCRIPTION

FIGS. 1-4 show a paramotor 100 according to some aspects of the invention. The paramotor 100 generally includes a frame 102 attached to a hoop 110 via one or more spars 108. A pilot harness (not shown) is attached to the frame, which allows a pilot to secure the paramotor 100 to her back. The frame 102 also includes motor mounts 112 for attaching any suitable motor and propeller combination (not shown), which generally provides thrust for the paramotor 100 during flight via a user-operated throttle (also not shown). A fuel tank 106 is attached the frame and serves as a fuel source for the motor during flight.

The spars 108 extend from the frame 102 and terminate at the hoop 110. In some embodiments, the paramotor 100 may include a net or similar (not shown) stretched across the hoop 110, which serves to prevent contact between the pilot and various components of the paramotor 100, such as a paraglider wing (not shown), with the spinning propeller. As will be discussed in detail below, the hoop 110 includes a tensioning system 114 to improve the rigidity thereof and to ensure the hoop 110 remains intact during takeoff, flight, and landing.

Figure 1:
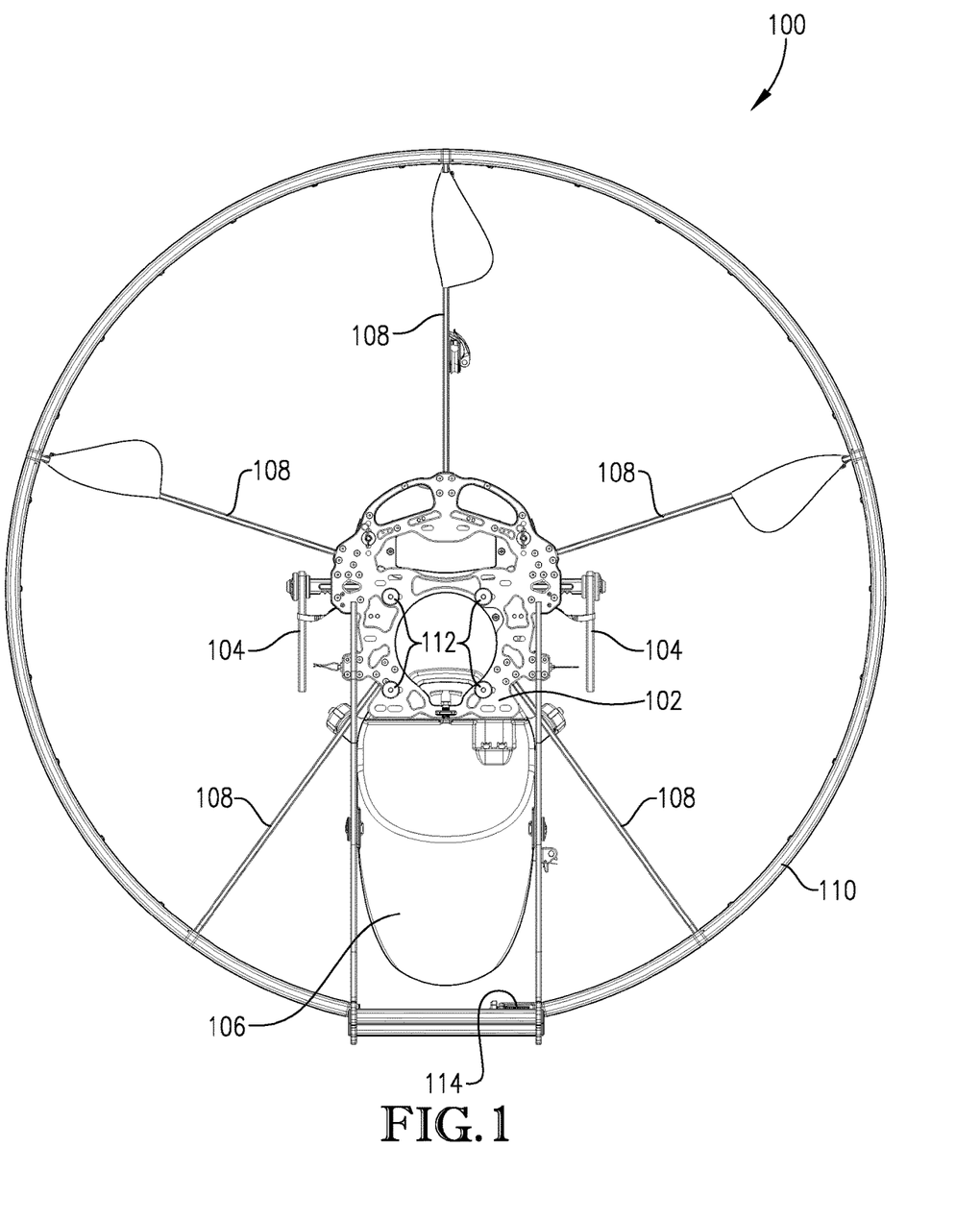
FIG. 1 is a back view of a paramotor according to one embodiment of the invention.
Figure 2:
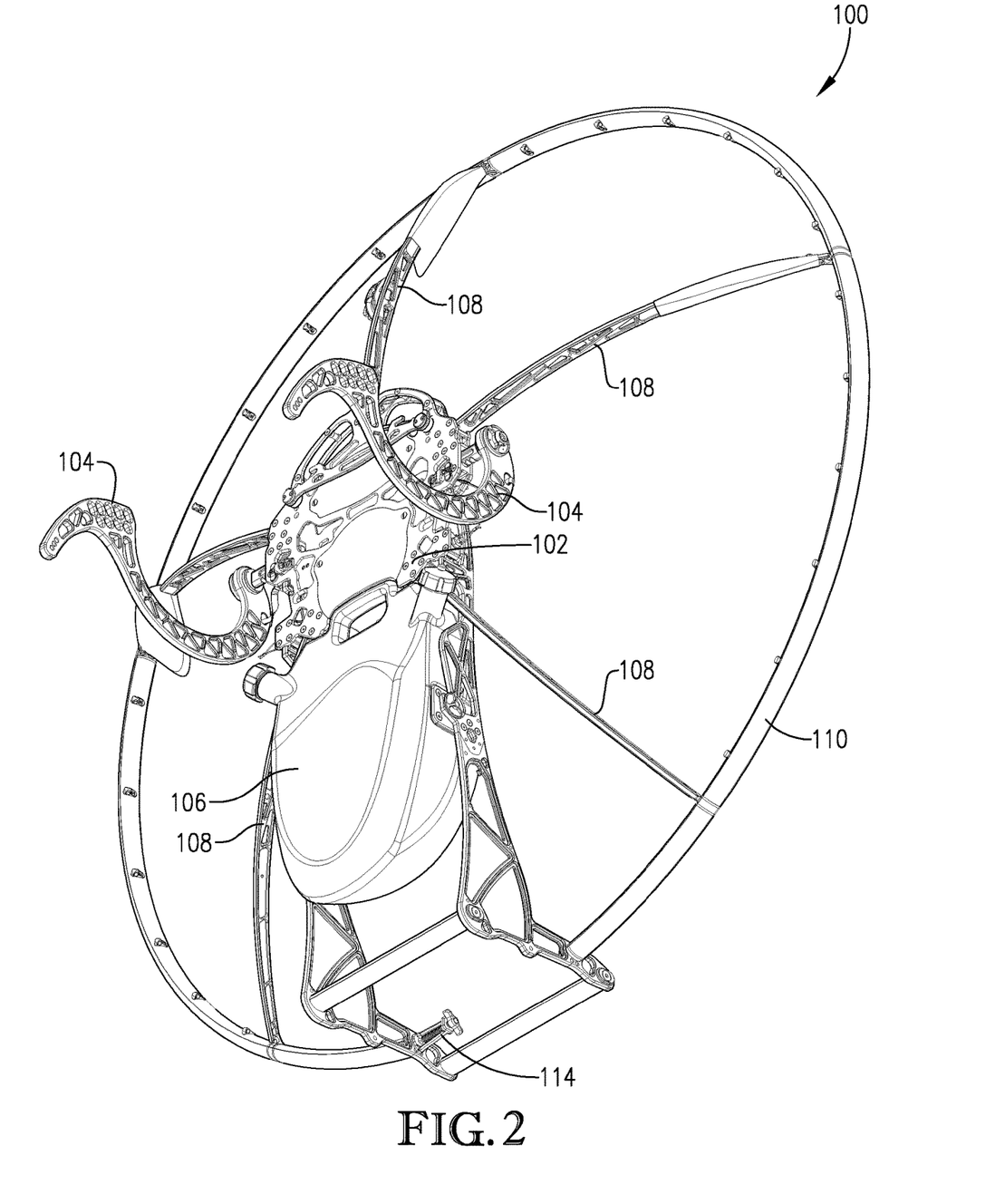
FIG. 2 is a right-front perspective view of the paramotor shown in FIG. 1.
Figure 3:
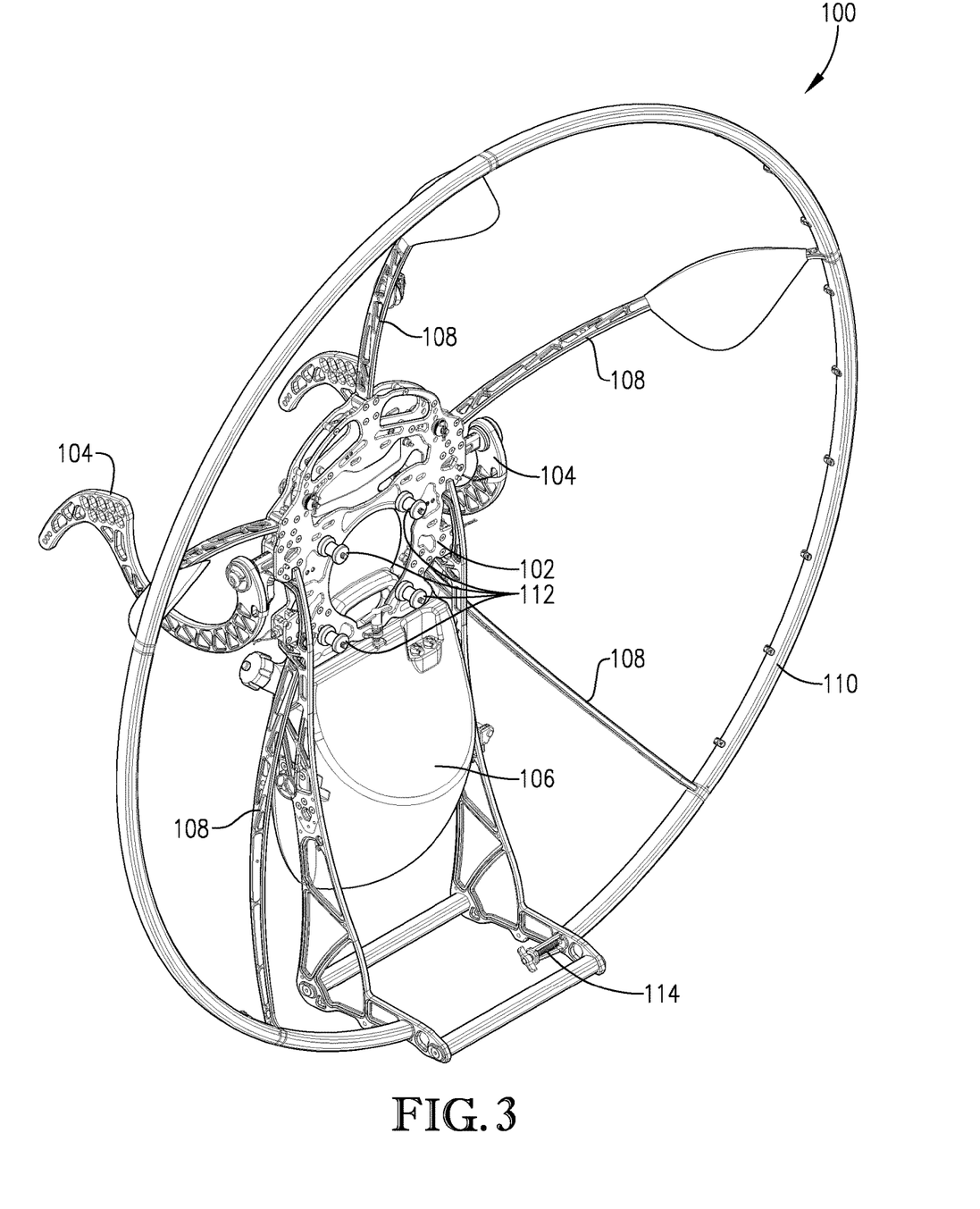
FIG. 3 is a right-back perspective view of the paramotor shown in FIG. 1.
Figure 4:
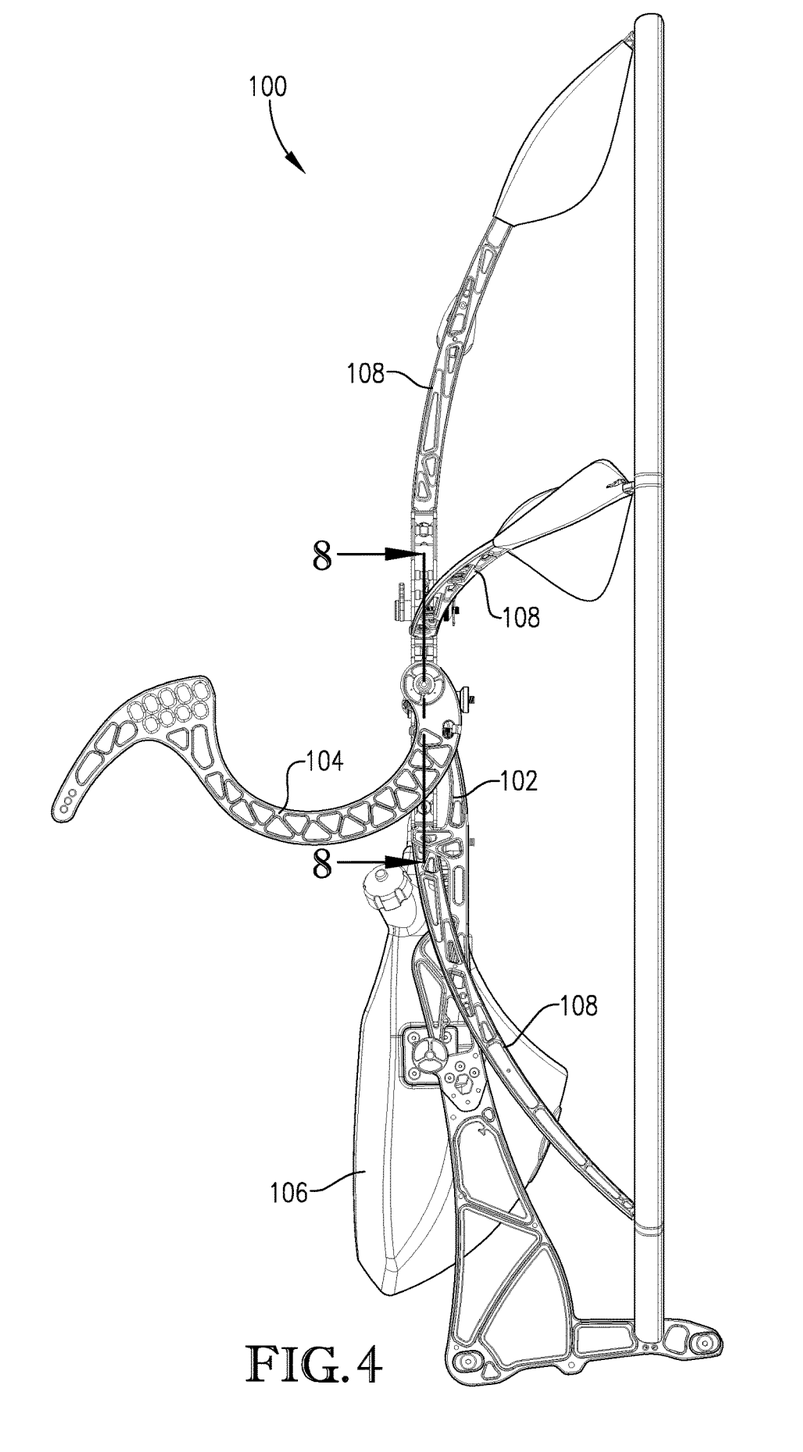
FIG. 4 is a right side view of the paramotor shown in FIG. 1.
Figure 5:
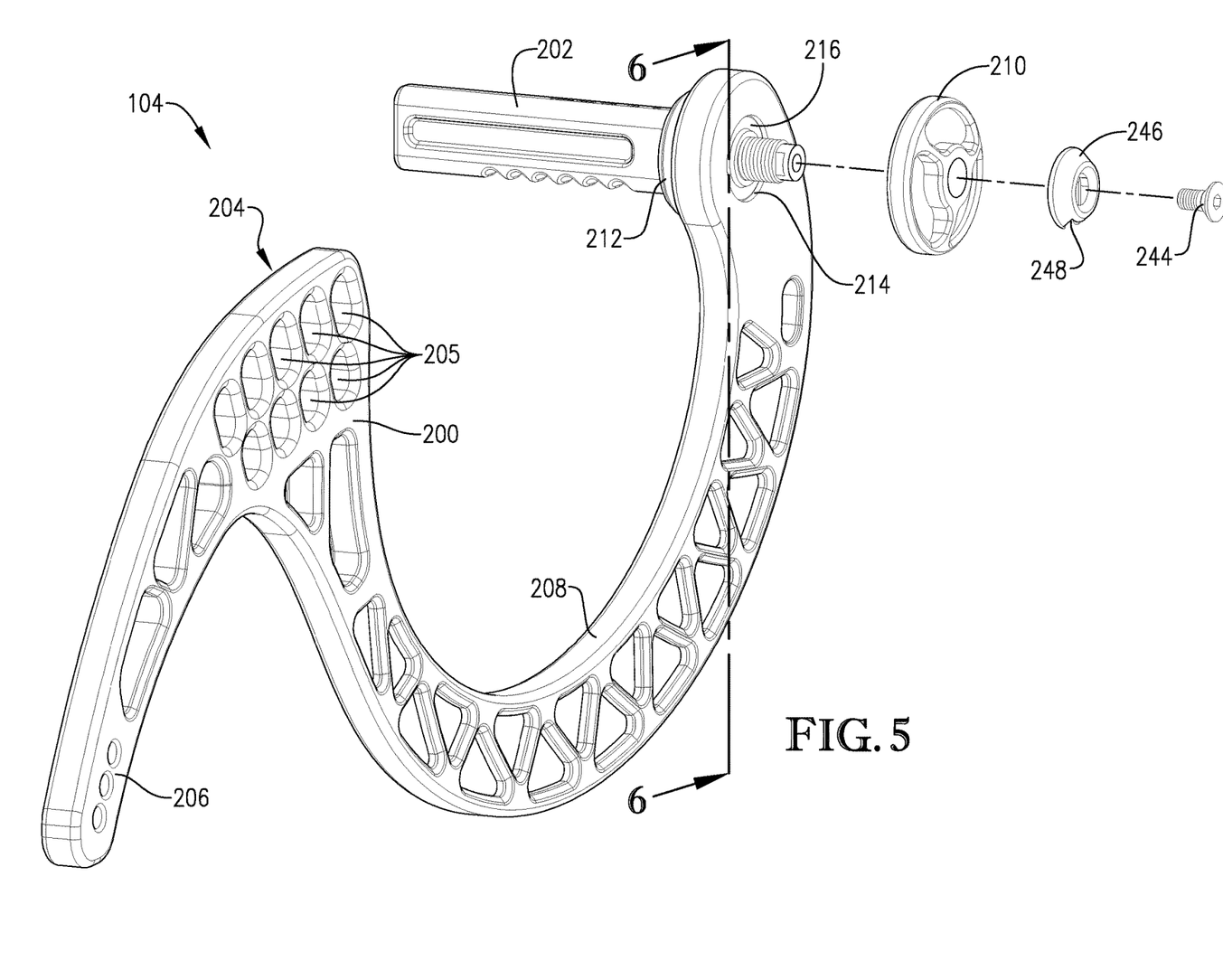
FIG. 5 is a right-front perspective view of a swing arm assembly of the paramotor shown in FIG. 1.

A pair of swing arm assemblies 104 are removably coupled to the frame 102 via a pair of arm pegs 202. As best seen in FIG. 5, each swing arm assembly 104 generally includes a swing arm 200, an arm peg 202, and a pair of limiting disks including an outer limiting disk 210 and an inner limiting disk 212 securing the arm peg 202 to the swing arm 200.

The swing arm 200 includes an attachment portion 204 including a plurality of attachment holes 205. The attachment holes 205 are through-holes formed in the swing arm 200 to which a user attaches a carabiner or similar when securing the paraglider wing to the paramotor 100. More particularly, in some embodiments the paraglider wing may include a series of lines extending from the wing and collected at a pair of risers. Each riser may include a carabiner that, when used for paragliding, is attached to a user's harness, and, when used for powered paragliding, is attached to one of the attachment holes 205 on the swing arm 200.

The swing arm 200 also includes a handle portion 206 and underarm portion 208. The handle portion 206 is provided at a distal end of the swing arm (i.e., an end of the arm farthest from the frame 102, when mounted), and generally includes a tapered contour so that, during use, a pilot can grasp the handle portion 206. The underarm portion 208 is provided between the distal end and a proximate end of the swing arm 200 (i.e., an end of the arm nearest the frame 102, when mounted), and includes a substantially U-shaped portion such that, during use, a pilot can place her arm over the underarm portion 208 and grasp the handle portion 206 in order to control the paramotor 100. Finally, the swing arm 200 includes a bearing hole 214 at the proximate end of the arm, with a spherical bearing 216 (FIGS. 6, 8, 9) press fit therein.

The arm peg 202 is attached to the swing arm 200 at the proximate end thereof, via the bearing hole 214. More particularly, and as best understood with reference to FIGS. 6-9, the spherical bearing 216 includes an outer ring 218 and an inner roller part 220 rotatably received in the outer ring 218. The inner roller 220 includes a partially spherical outer surface (i.e., the outer surface is spherical but for the portion interrupted by a central opening of the inner roller 220), and the outer ring 218 has a bearing surface matching the contour of the partially spherical outer surface. The spherical bearing 216 may be constructed of any suitable material for performing its mechanical function and, in some embodiments, is a metal bearing constructed of steel. In other embodiments, the spherical bearing 216 is a plastic bearing constructed of, e.g., nylon or other suitable polymer. The spherical bearing 216 is embedded into the swing arm 200 at the bearing hole 214 and, in some embodiments, is press fit into the swing arm 200 and secured using a locking bearing compound.

Figure 6:
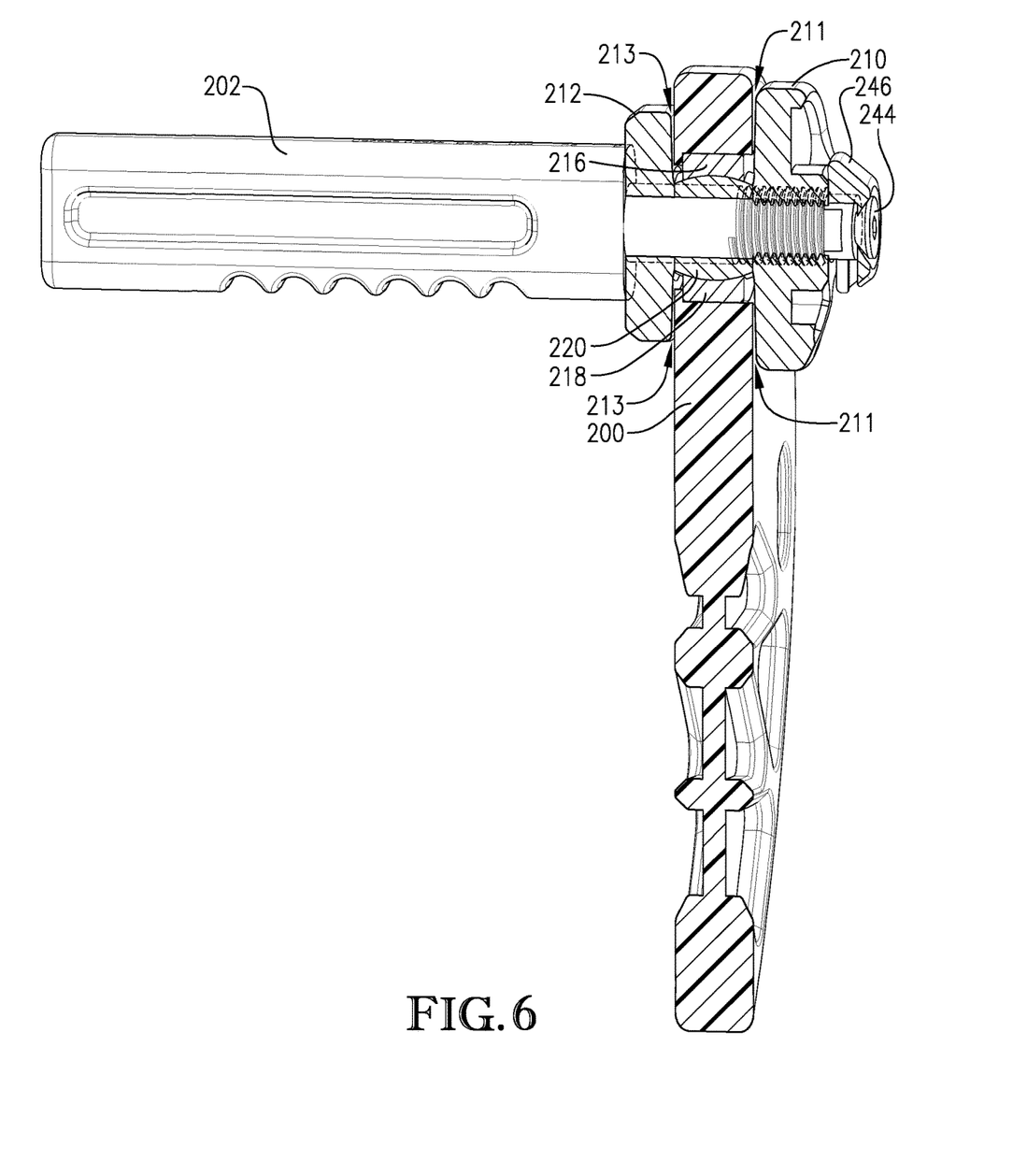
FIG. 6 is a partial sectional view of the swing-arm assembly shown in FIG. 5, along line 6-6 in FIG. 5.

The arm peg 202 includes a bearing shaft 222, a shoulder 226 at a proximate end of the bearing shaft 222, and a threaded distal end 224 of the bearing shaft 222. An outer diameter of the arm peg 202's bearing shaft 222 is slightly smaller than the diameter of a through hole provided in the spherical bearing 216's roller part 220. The arm peg 202's bearing shaft can thus extend through the through hole and is secured to the swing arm via two limiting disks: an outer limiting disk 210 and inner limiting disk 212. More particularly, the bearing shaft 222 extends through the inner limiting disk 212, through the spherical bearing 216, and into the outer limiting disk 210. The outer limiting disk 210 includes a threaded hole configured to receive the threaded end 224 of the bearing shaft 222. The outer limiting disk 210 is thus tightened down (i.e., threaded on) the arm peg 202's bearing shaft 222 (more particularly, the threaded distal end 224 thereof), until the shoulder 226 firmly engages an outer surface of the inner limiting disk 212, and the inner surfaces of the inner and outer limiting disks 212, 220 firmly engage the spherical bearing 216 (as best seen in FIG. 6).

The limiting disks 210, 212 may be constructed of any suitable material and, in some embodiments, may be a synthetic polymer such as nylon, or may be a metallic material such as steel. Limiting disks 210, 212 may be any suitable size and, in some embodiments, are approximately 1 to 2.5 inches in diameter, and more particularly about 45 mm (approximately 1.75 inches) in diameter.

The limiting disks 210, 212 firmly engage the roller part 220, but otherwise does not firmly engage the swing arm 200. In this regard, the swing arm 200 is independently movable of the arm peg 202 and limiting disks 210, 212 via the outer ring 218 slidably engaging the inner roller 220. Moreover, and unlike other swing arms—which are only pivotable in the vertical plane—the swing arm 200 can move both vertically and horizontally via the spherical bearing 116. More particularly, the respective inner surfaces of the limiting disks 210, 212 are tapered such that there is a clearance 211, 213, formed between the limiting disks 210, 212 and the swing arm 200. This allows for lateral movement (i.e., movement to the left and right as depicted in FIG. 6) by the swing arm 202. That is, the swing arm 200 is free to travel in virtually any direction (i.e., is fully articulable), including in the lateral direction. The swing arm 200 is free to move in the lateral direction until the outer faces of the arm contact one or both limiting disks 210, 212.

This fully articulable swing arm 200 provides a pilot better and safer flight experience, as the more movement allows for greater weight shift sensitivity, more precise in-flight control of the paramotor 100 and provide feedback and/or damping to the pilot when the paraglider encounters turbulence. The above-described configuration also improves durability of the swing arm assembly 104 as compared to known assemblies, which instead utilized a bolt and nylon locknut or similar, prone to early failure.

Moreover, the amount of lateral movement provided by the swing arm assembly 104 is customizable simply by selecting and installing appropriate limiting disks 210, 212 to provide the desired amount of clearance 211, 213. Put another way, the angle machined or molded into the inner faces of the limiting disks 210, 212 may be adjusted to allow for more or less articulation/rotation of the swing arm 200. Again, the limit of articulation is established as the swing arm 200 makes contact with the angle of the limiting disk, preventing further movement of the arm. Thus, pilots wanting greater mobility of the swing arms 200 can select limiting disks 210, 212 that are machined with relatively large tapers/angles to provide relatively large clearances 211, 213. In contrast, pilots wanting little or no lateral movement of the swing arms 200 can select limiting disks 210, 212 that are machined with relatively small tapers/angles to provide relatively small clearances 211, 213, or even no clearances, between the face of the swing arms and the inner surfaces of the limiting disks 210, 212. In some embodiments, limiting disks 210, 212 can be selected to provide anything from 0 inches of lateral movement (measured at the attachment location 204 of the swing arm 200, where the arm attaches to a riser of the paraglider wing) up to 5 inches either side of center or even more of lateral movement.

This lateral movement results in a paramotoring experience more closely resembling a paragliding experience. That is, for limiting disks 210, 212 allowing approximately 5 inches of swing arm 200 lateral movement, the pilot may experience about 50-75% weight shift replication of paragliding, whereas pilots of known paramotor systems may only experience approximately 10% weight shift replication of paragliding.

The swing arm assembly 104 attaches to the frame 102 via the arm peg 202. As best seem in FIG. 7, the frame 102 includes two arm peg block assemblies 232 (only one shown in FIG. 7), one corresponding to each swing arm assembly 104. The arm peg block assembly 232 includes a socket 234 and a pin hole 236. The swing arm assembly 104 attaches to the frame 102 by sliding the arm peg 202 into the socket 234 a desired lateral distance, and placing a pin 238 through the pin hole 236, securing the arm peg 202 in the frame 102 (more particularly, within the arm peg block assembly 232).

Figure 8:
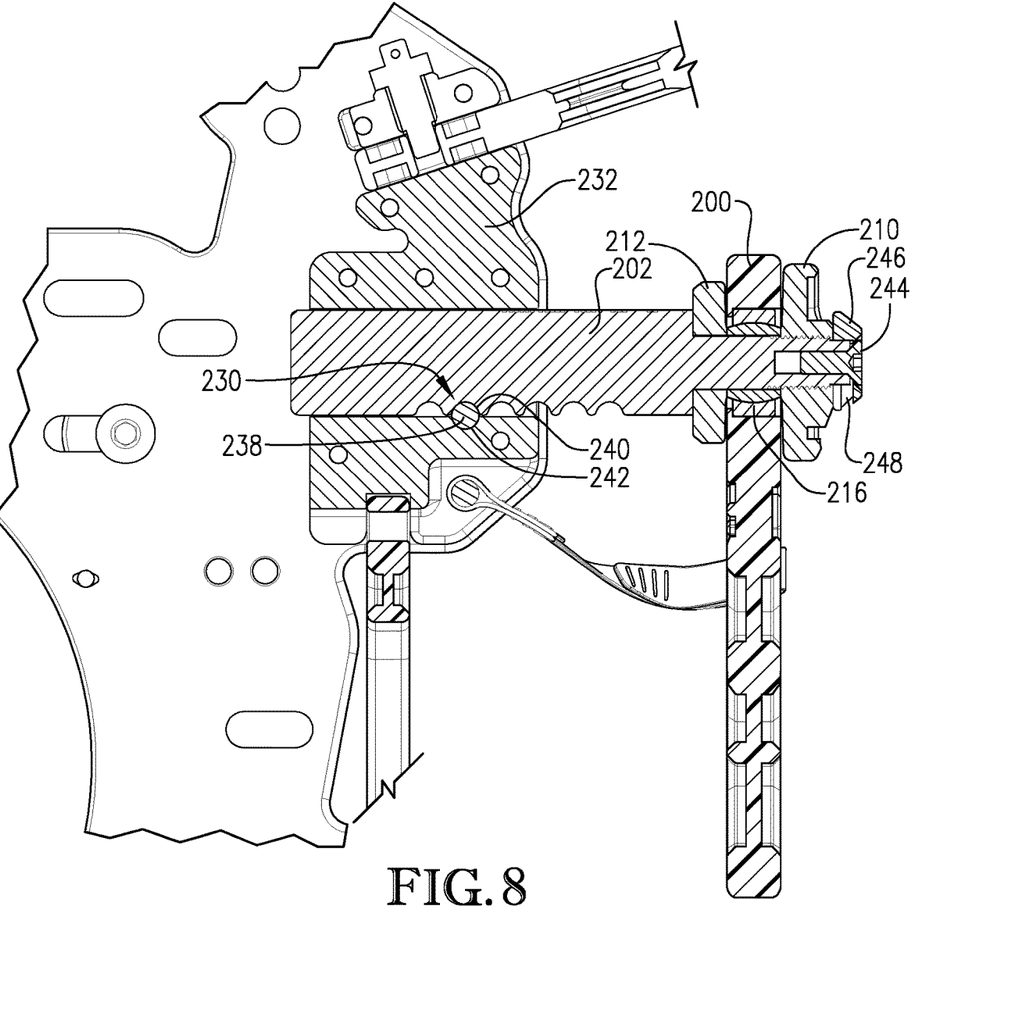
FIG. 8 is a partial sectional view of the paramotor shown in FIG. 1, along line 8-8 in FIG. 4.

Each arm peg 202 includes a pin engagement portion 228 including a plurality of notches 230 (in the depicted embodiment, six notches) on a periphery of the arm peg 202. Each notch 230 is configured to receive the pin 238, which, in turn, restricts lateral movement of the arm peg 202. For example, and as best seen in FIG. 8, a partial circumferential surface 240 of the notch 230 engages the outer circumferential surface 242 of the pin 238, restricting lateral movement of the arm peg 202, and thus the swing arm assembly 104. Because the notches 230 are provided on a periphery of the arm peg 202, the arm peg 202 retains its structural integrity. For example, in some embodiments, placing through holes or the like through a center of an arm peg results in a near 50% strength reduction as compared to the arm peg 202 shown and described herein. Accordingly, locating the notches 230 on the arm peg 202's periphery (rather than, e.g., a center portion thereof) provides a relatively compact, yet structurally sound, design.

Figure 7:
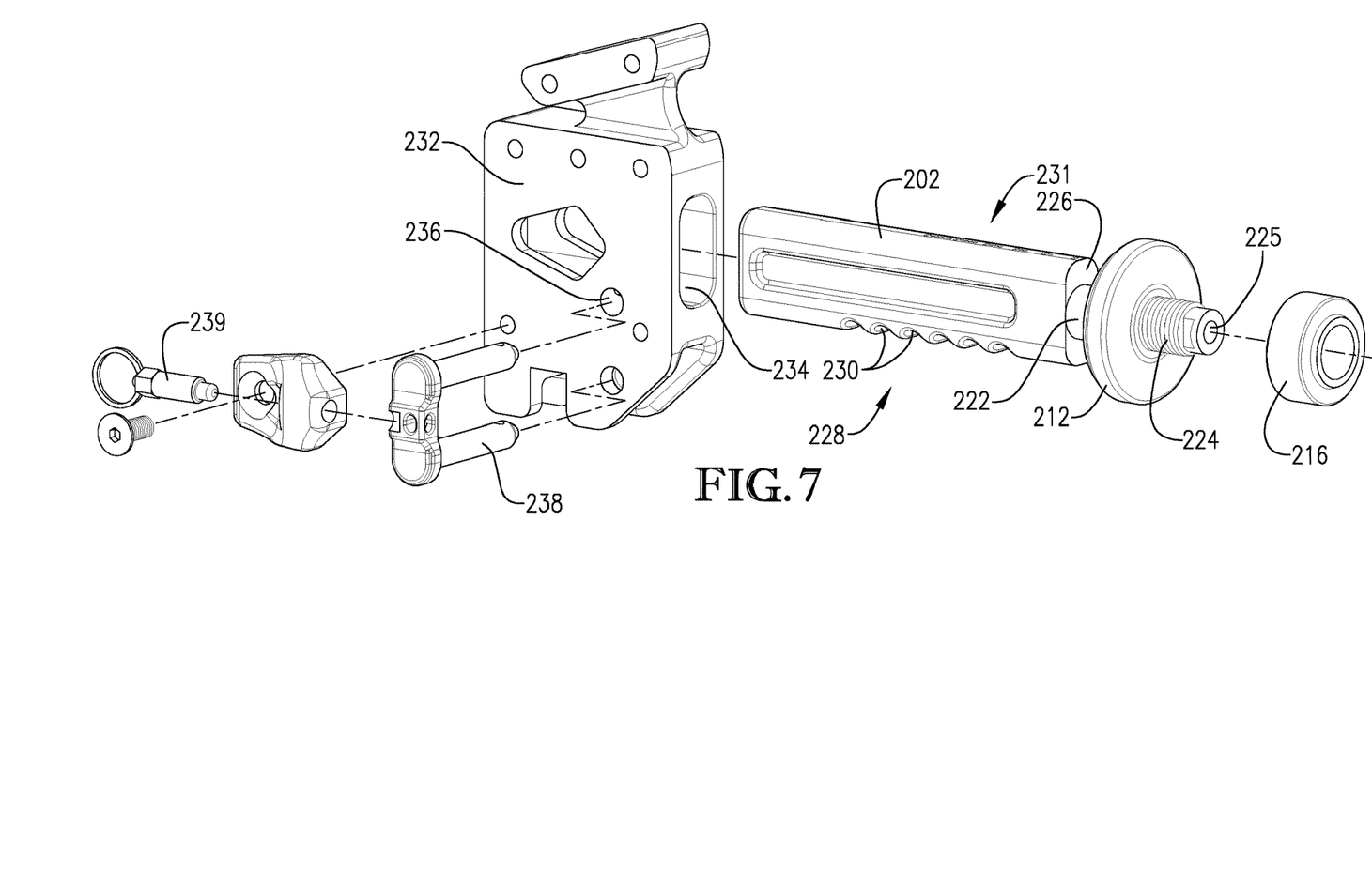
FIG. 7 is a right-front perspective view of an arm peg of the swing arm assembly shown in FIG. 5, along with a portion of a frame of the paramotor.
Figure 9:
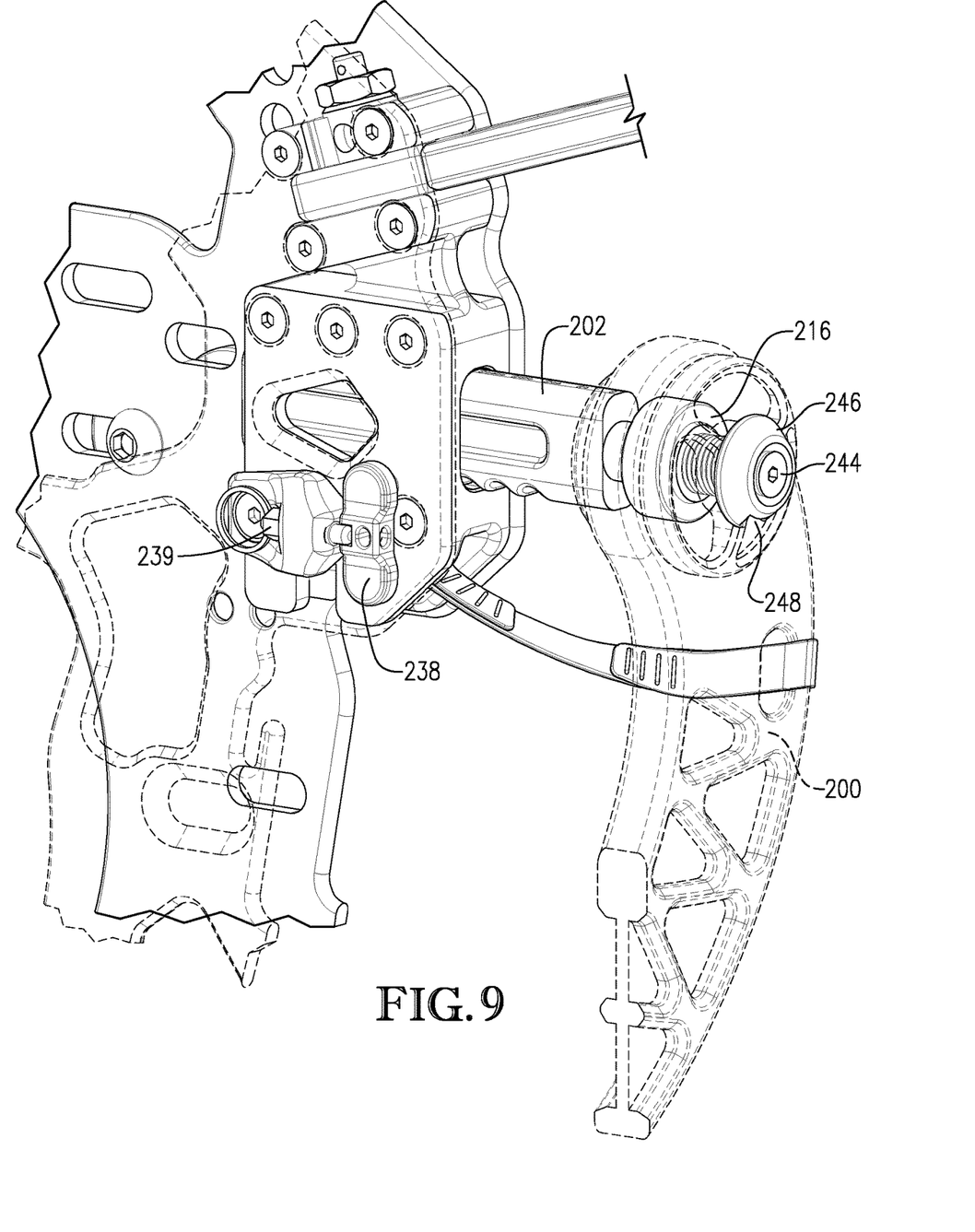
FIG. 9 is a partial right-front perspective view of the paramotor shown in FIG. 1, with portions of a swing arm and limiting disk shown as transparent.

Although the pin 238 shown in FIG. 7 includes a relatively simple construction, embodiments of the pin 238 are not so limited. For example, FIG. 9 depicts another embodiment of a suitable pin 238 including both the locking pin portion 238, and a transversely extending retaining pin portion 239.

Although the figures depict an embodiment of an arm peg 202 including six notches 230, other embodiments of the invention may include different lengths of arm pegs 202 and/or ones containing more or less notches 230 to provide an appropriate amount of lateral adjustment. By way of example, the depicted arm pegs 202 may allow a pilot to adjust the width (i.e., the lateral spacing between the two swing arms 104) by about 4.5 inches, from a minimum spacing of 15 inches to a maximum spacing of 19.5 inches. However, in other embodiments pegs longer than the depicted arm pegs 202 and/or ones containing more notches 230 may be utilized to provide for a greater range of width adjustment. For example, longer pegs or ones containing more notches 230 may be use used to allow for 6 to 7 inches, or even more, of width adjustment.

Moreover, because each arm peg 202 includes a plurality of notches 230, the swing arm assemblies 104 can be mounted at different lateral positions with respect to the frame 102. That is, the arms 200 may be offset from center by using different notches on each side of frame 102. Returning to FIG. 8, the depicted arm peg 202 is mounted almost as far away from the frame 102 as the peg 202 will allow; i.e., the arm peg 202 is mounted using the fifth notch from the inner limiting disk 212. But on the opposite side of the frame 102 (not shown) the other swing arm assembly 104 may be mounted closer to the frame 102 using, e.g., the closest notch 230 to the corresponding inner limiting disk 212.

In some embodiments, the arm peg 202 may further include markings 231 to indicate the location at which the arm peg 202 is installed within the respective peg block assembly 232, as best seen in FIG. 7. The markings 231 may be visible from the outside of the frame 102, or otherwise visible through a witness hole or the like provided in the frame 102/peg block assembly 232 to ensure the arm pegs 202 are located in the proper lateral location for pinning/securing to the frame 102 via locking pin 238.

The adjustability of the lateral location of the swing arm assemblies 104 via the arm pegs 202 provides for greater customability of the paramotor 100 as compared to known systems. For example, the swing arms 200 may be mounted farther apart from each other for larger pilots, and closer together for smaller pilots. Moreover, a pilot may set a desired weight-shift sensitivity of the paramotor 100 system by moving the arm assemblies 104 in or out with respect to the frame 102. More experienced pilots may prefer a more responsive system, and thus prefer to extend the arms 200 outwards from the frame 102, while beginner pilots or those wishing to experience a more docile flight may instead choose to mount the arms 200 closer into the frame 102. Still more, because the lateral location of each arm 200 may be set independent of the other, the pilot may place the arms off center (i.e., set an appropriate right or left offset) in an effort to, e.g., counteract a torque of the motor/propeller. And because the assemblies are easily adjustable, this offset is quickly changed if the paramotor 100 is later equipped with a different motor or other equipment requiring a different offset and/or lateral spacing. Thus, the paramotor 100 is capable of implementing any motor—regardless of the direction of rotation—because the arm pegs 202 are easily movable to mount the swing arms 200 at the appropriate location/offset to adjust to the new component. Moreover, a pilot can quickly adjust the swing arm 200 spacing in response to varying ambient conditions.

Still more, the arm pegs 202 and their respective peg block assemblies 232 allow the pilot to quickly adjust the arm assembly 104 location by simply removing locking pin 238, sliding the arm peg 202 in or out of the arm peg block assembly 232, and replacing pin 238. This may be done in a matter of minutes, without requiring any special tools. And the mounting configuration described and shown also provides for increased strength as compared to known systems. Whereas known paramotors typically bolt the swing arm assemblies to the frame, and thus are only as strong as the bolt used, the mounting system described above exhibits approximately six times shear strength of bolted systems.

Still more, the adjustable arm pegs 202 allow a pilot to maintain an appropriate distance between riser attachments. For example, a manufacturer of a particular paraglider wing may specify that the risers should be mounted 42 cm+/−2 cm apart. A pilot can thus adjust the width of the swing arm assemblies 104, via the arm pegs 202/locking pins 238, so that the respective attachment portions 204 are spaced an appropriate distance to ensure the bottom of the risers are mounted 42 cm+/−2 cm apart. The adjustability is also beneficial for dealers maintaining student and training equipment. Namely, the features described herein allow dealers/training centers to adjust a single unit to accommodate a variety of sizes of pilots without the need for additional equipment or compared to a fixed position swing arm. The system thus reduces dealer and training costs, inventory, and time necessary to modify units. The system also allows users to adjust for changes related to their size or weather-related clothing without compromising performance or requiring a change in equipment.

In some embodiments, the arm peg 202 may be further secured to the swing arm 202 via secondary or tertiary securing mechanisms; i.e., mechanisms in addition to the threaded distal end 224 of the bearing shaft 222. For example, as best seen in FIG. 8, the swing arm assembly 104 may also include a dovetail fastener 246 and/or a threaded fastener 244. The dovetail fastener 246 further secures the swing arm assembly 104 together due to the frictional contact between the dovetail fastener 246 and the outer limiting disk 210. In some embodiments, the dovetail fastener 246 may include a notch 248 (best seen in FIG. 9), which receives a corresponding projection on the outer limiting disk 210 (not shown) to further secure the assembly together. The threaded fastener 244 in turn secures dovetail fastener 246 in place by extending through the dovetail fastener 246 and threading into a threaded hole 225 provided in the distal end face of the bearing shaft 222. These added fasteners provide additional securing means to ensure the integrity of the swing arm assembly 104 during flight.

In short, the entire swing arm assembly 104—including the spherical bearing 216, limiting disks 210, 212, and adjusting peg arm 202/locking pin 238—provides for greater customability and adaptability of the paramotor 100, allowing the paramotor 100 to be utilized across a variety of pilot sizes and abilities, weather conditions, and motor/propeller configurations. Moreover, the above configuration allows adjustments to be made in a matter of minutes, with no special tools required. Unlike traditional swing arms—which are fixed to the frame or, at best, pivotable in one direction—the swing arm assembly 104 shown and described is a multidirectional swing arm that can be modified in the field in a matter of minutes to capture an operational and performance benefit or accommodate varying pilot sizes.

Figure 10:
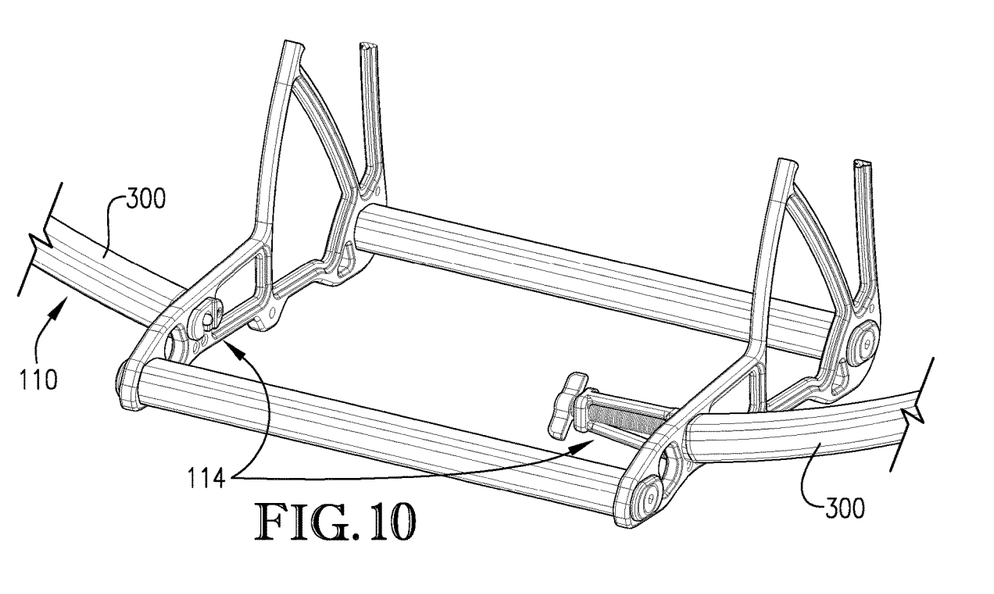
FIG. 10 is a partial left-back perspective view the paramotor shown in FIG. 1.
Figure 11:
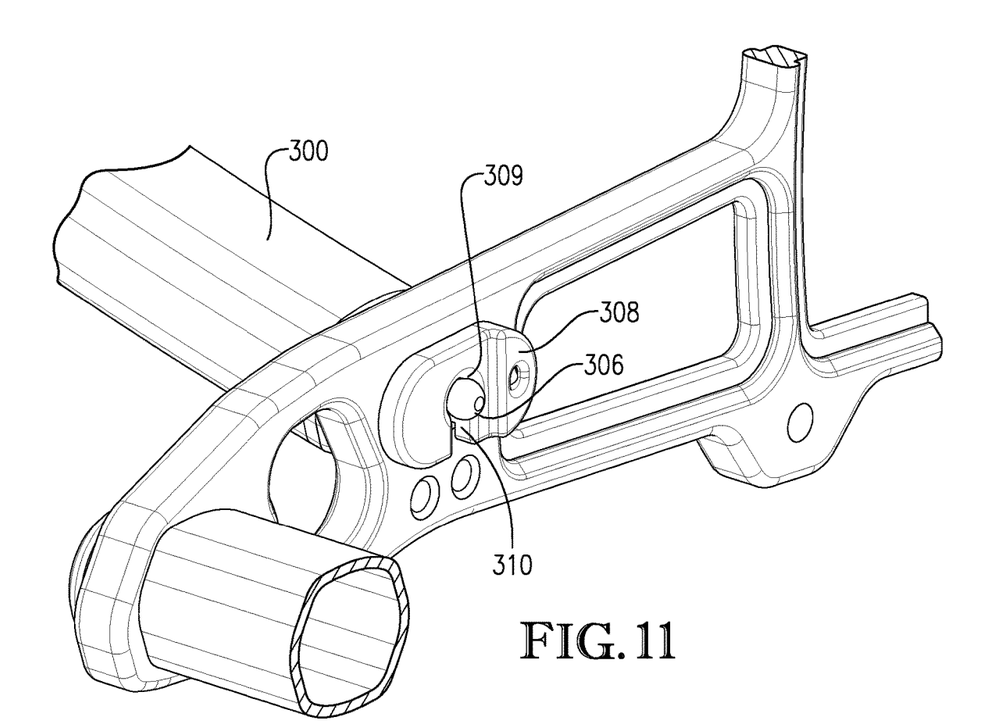
FIG. 11 is a partial left-back perspective view of the paramotor shown in FIG. 1.
Figure 12:
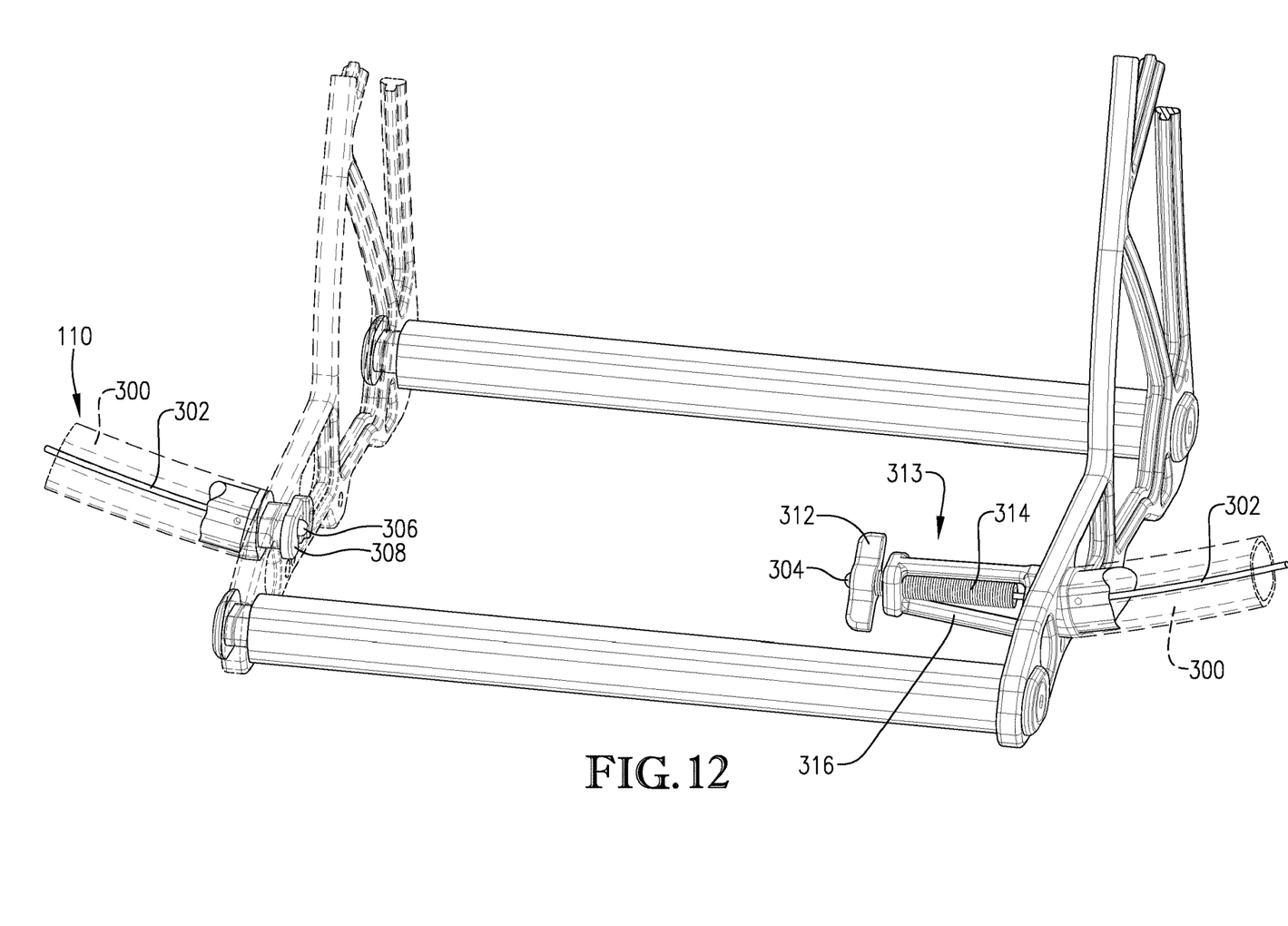
FIG. 12 is a partial left-back perspective view of the paramotor shown in FIG. 1, with portions of a hoop shown as transparent.

As best seen in FIGS. 10-12, other aspects of the invention are directed to a tensioner system 114 used to provide a sufficient tension to the hoop 110 during flight. The hoop 110 may be constructed of one or more sections of hollow tubing 300. In the depicted embodiment, a tension cable 302 is routed through the inside of the hollow tubing 300, such that the tension cable 302 creates a nearly complete circle. The tension cable 302 may be any suitable material for providing tension to the hoop 110, and, in some embodiments comprises a steel cable or nylon rope. The tension cable 302 includes a terminating attachment system such as a ball 304, 306 attached to each end thereof, and is anchored to the hoop 110 via an anchor 308 and a threaded tensioner 313. That is, a first of the balls 304 is seated within a handle 312 of the tensioner 313, and the tension cable 302 extends therefrom, through the circumference of the hollow tubing 300, and terminates at the anchor 308. The second of the balls 306 is secured in a seat 309 of the anchor 308 via slot 310. More particularly, an end of tension cable proximate to the ball 306 is slid through the slot 310 so that the ball 306 firmly rests within the seat 309.

In this regard, the tension cable 302 forms a nearly complete circle along the inside of the hollow tubing 300, originating at the handle 312 of the tensioner 313, extending the circumferential length of the hoop 110, and terminating at the anchor 308. The threaded tensioner 313 also includes a hollow, threaded shaft 314 provided in a corresponding threaded frame 316, with the end of the tension cable 302 nearest ball 304 extending through the hollow, threaded shaft 314. Turning the handle 312 of the threaded tensioner 313 causes the threaded shaft 314 to extend out of or retract into the threaded frame 316, thereby increasing or decreasing, respectively, the circumferential length of the tension cable 302 attached thereto via ball 306. This in turn increases or decreases, respectively, the tension on the tension cable 302 and ultimately the hoop 110 itself. For example, in some embodiments the tension of the cable 302 can be increased to about 600 lbs. of tension, or about a ten-fold increase over known paramotor tensioning systems. The tensioning system 114 also results in most of the tension cable 302 being placed within the hollow tubing 300, protecting the tension cable 302 from the elements and thus prolonging the life thereof.

Although the tensioning system 114 has been described in connection with a threaded tensioner 313, in other embodiments other suitable mechanisms may be used to apply an appropriate tension to the cable. For example, in some embodiments a ratcheting handle may be secured to the end of the tension cable 302, which in turn may apply a sufficient tension to the cable by ratcheting the handle back and forth.

In any event, the described tensioning system 114 allows for the use of lightweight, hollow tubing while still providing the rigidity and strength needed to adequately protect a pilot and paraglider wing during flight. Moreover, in embodiments where the hoop 110 is constructed of multiple, discrete sections of tubing 300 (in order to, e.g., allow a user to dismantle the hoop 110 after flight), the tension cable 302 secures the sections together, ensuring they do not separate during flight. The tension is maintained until a user releases the tension using the threaded tensioner 313 (i.e., by screwing the threaded shaft 314 into the threaded frame 316, thus releasing the tension on the tension cable 302) in order to, e.g., disassemble paramotor 100.

The various components may be formed using any suitable manufacturing process and, in some embodiments, are machined via CNC methods using raw materials, through a plastic/metal molding process, or by bending and welding various prefabricated components such as metal tubing. Moreover, the embodiments of the invention have been described herein to be illustrative rather than restrictive. Alternative embodiments will become apparent to readers of this disclosure. Further, alternative means of implementing the aforementioned elements and steps can be used without departing from the scope of the claims, as would be understood by one having ordinary skill in the art. Certain features and sub-combinations are of utility and may be employed without reference to other features and sub-combinations, and are contemplated as within the scope of the claims.

We claim:

1. A swing arm assembly for a paramotor, the swing arm assembly comprising:
    a swing arm including two opposing faces and a bearing hole portion comprising a through hole extending between the two opposing faces;
    a spherical bearing within the bearing hole portion;
    an arm peg extending through a central opening of the spherical bearing;
    a first pair of limiting disks located proximate to the bearing hole portion and contacting the spherical bearing,
    wherein first inner faces of the first pair of limiting disks include a first taper such that a first clearance is formed between each of the opposing faces of the swing arm and a corresponding first inner face of one of the limiting disks; and
    a second pair of limiting disks interchangeable with the first pair of limiting disks, wherein when the first pair of limiting disks is interchanged with the second pair of limiting disks, the second pair of limiting disks is located proximate to the bearing hole portion and contacts the spherical bearing,
    wherein second inner faces of the second pair of limiting disks include a second taper different from the first taper such that a second clearance different from the first clearance is formed between each of the opposing faces of the swing arm and a corresponding second inner face of one of the limiting disks.

2. The swing arm assembly of claim 1, wherein the swing arm is pivotable in both a vertical direction and a lateral direction substantially perpendicular to the vertical direction via the spherical bearing.

3. The swing arm assembly of claim 2, wherein the swing arm is pivotable in the lateral direction from a vertical position to a first position where at least one of the faces of the swing arm contacts at least one of the first part of limiting disks, and wherein when the first pair of limiting disks is interchanged with the second pair of limiting disks, the swing arm is pivotable in the lateral direction from the vertical position to a second position different from the first position where at least one of the faces of the swing arm contacts at least one of the second pair of limiting disks.

4. The swing arm assembly of claim 1, wherein the spherical bearing includes an outer ring and an inner roller rotatably received with the outer ring.

5. The swing arm assembly of claim 4, wherein each of the first pair of limiting disks contacts the inner roller and does not contact the outer ring, and when the first pair of limiting disks is interchanged with the second pair of limiting disks, each of the second pair of limiting disks contacts the inner roller and does not contact the outer ring.

6. The swing arm assembly of claim 1 further comprising a dovetail fastener, wherein the dovetail fastener engages an outer surface of an outer limiting disk.

7. The swing arm assembly of claim 6 further comprising a threaded fastener, wherein the threaded fastener extends through a through hole of the dovetail fastener and is received in a threaded hole provided in a distal end face of the arm peg.

8. A swing arm assembly for a paramotor, the swing arm assembly comprising:
    a swing arm including a spherical bearing having an outer ring and an inner roller rotatably received within the outer ring, the inner roller including a partial spherical outer surface and a central opening;
    a pair of limiting disks including an outer limiting disk and an inner limiting disk, each limiting disk including an inner surface and a central through hole, and wherein the central through hole of the outer limiting disk is a threaded through hole;
    an arm peg including a proximate end having a plurality of notches provided on the periphery of the arm peg, a shoulder, and a bearing shaft, the bearing shaft extending from the shoulder and including a threaded distal end;
    an arm peg receiving block including a socket; and
    a locking pin,
    wherein the bearing shaft extends through a central through hole of the inner limiting disk, through the central opening of the inner roller, and is threaded into the threaded through hole of the outer limiting disk such that the inner surfaces of the limiting disks contact the inner roller, and such that an outer surface of the inner limiting disk contacts the shoulder; and
    wherein the proximate end of the arm peg extends into the socket of the arm peg receiving block and is secured via the locking pin.

9. The swing arm assembly of claim 8, wherein each of the plurality of notches includes a partially circumferential portion on the periphery of the arm peg configured to engage a circumferential surface of the locking pin.

10. The swing arm assembly of claim 8 further comprising a retaining pin, wherein a shaft of the retaining pin extends substantially perpendicular to a shaft of the locking pin, and wherein the retaining pin retains the locking pin in a pin hole of the arm peg receiving block.

11. The swing arm assembly of claim 8, wherein inner faces of the pair of limiting disks include a taper.

12. The swing arm assembly of claim 9, wherein the taper of each inner face forms a clearance between the respective inner face and a corresponding opposing face of the swing arm proximate to the inner face.

13. A paramotor comprising:
   a frame including a pair of arm peg receiving blocks, each including a socket and a locking pin;
   a hoop connected to the frame via a plurality of spars; and
   a pair swing arm assemblies removably coupled to the frame via the pair of arm peg receiving blocks, each of swing arm assemblies including:
      a swing arm including two opposing faces and a bearing hole portion comprising a through hole extending through the two opposing faces;
      a spherical bearing within the bearing hole portion and having an outer ring and an inner roller rotatably received within the outer ring, the inner roller including a partial spherical outer surface and a central opening;
      a pair of limiting disks located proximate to the bearing hole portion, each limiting disk including a tapered inner surface and a central through hole, wherein the central through hole of an outer limiting disk is a threaded through hole; and
      an arm peg including a proximate end having a plurality of notches provided on a periphery of the arm peg, a shoulder, and a bearing shaft, the bearing shaft extending from the shoulder and including a threaded distal end,
   wherein the bearing shaft extends through the central through hole of an inner limiting disk, through the central opening of the inner roller, and is threaded into the threaded through hole of the outer limiting disk such that the tapered inner surfaces of the limiting disks contact the inner roller and form a clearance between a face of the swing arm and the corresponding tapered inner surface, and such that an outer surface of the inner limiting disk contacts the shoulder; and
   wherein the proximate end of the arm peg extends into the socket of a corresponding arm peg receiving block and is secured via the locking pin.

14. The paramotor of claim 13, wherein a lateral distance between the swing arms is adjustable by sliding one or both of the arm pegs within a respective arm peg receiving block.

15. The paramotor of claim 13, wherein each of the plurality of notches includes a partially circumferential portion on the periphery of the arm peg configured to engage a circumferential surface of the locking pin.

16. The paramotor of claim 13, wherein the swing arm is pivotable in both a vertical direction and a lateral direction substantially perpendicular to the vertical direction via the spherical bearing.

17. The paramotor of claim 16, wherein the swing arm is pivotable in the lateral direction from a vertical position to a position where at least one of the faces of the swing arm contacts at least one limiting disk.

18. The paramotor of claim 13 further comprising a hoop tensioner system including a tension cable and a threaded tensioner.

19. The paramotor of claim 18, wherein the hoop includes hollow tubing, and wherein at least part of the tension cable is located within the hollow tubing.

20. The paramotor of claim 19, wherein each end of the tension cable includes a ball, wherein a first ball is received in a seat of an anchor of the hoop tensioner system, and wherein a second ball is received in a handle of the threaded tensioner.

* * * * *